US012299754B2

(12) United States Patent
Pierce et al.

(10) Patent No.: US 12,299,754 B2
(45) **Date of Patent: *May 13, 2025**

(54) SYSTEMS AND METHODS TO MONITOR VERACITY OF A COLLECTION OF ONE OR MORE PROFILES ASSOCIATED WITH A USER

(71) Applicant: NOTCOMMON CORP., Austin, TX (US)

(72) Inventors: Michael Robert Pierce, Austin, TX (US); Giulio Chiarenza, Austin, TX (US); Andrew Busey, Austin, TX (US)

(73) Assignee: NOTCOMMON CORP., Austin, TX (US)

( * ) Notice: Subject to any disclaimer, the term of this patent is extended or adjusted under 35 U.S.C. 154(b) by 35 days.

This patent is subject to a terminal disclaimer.

(21) Appl. No.: 18/456,390

(22) Filed: Aug. 25, 2023

(65) Prior Publication Data

US 2024/0370945 A1 Nov. 7, 2024

Related U.S. Application Data

(63) Continuation of application No. 18/312,799, filed on May 5, 2023, now Pat. No. 11,763,399.

(51) Int. Cl.
*G06Q 10/00* (2023.01)
*G06Q 50/00* (2012.01)

(52) U.S. Cl.
CPC .................................... *G06Q 50/01* (2013.01)

(58) Field of Classification Search
CPC ...................................................... G06Q 50/01
See application file for complete search history.

(56) References Cited

U.S. PATENT DOCUMENTS

2010/0274815 A1 10/2010 Vanasco
2013/0124644 A1 5/2013 Hunt
(Continued)

OTHER PUBLICATIONS

Greg Sides, Dara Fontein. How to Get Verified on Facebook: A Step by Step Guide. Oct. 27, 2021. (Retrieved at: https:// blog.hootsuite.com/how-to-get-verified-on-facebook/) (Year: 2021) (14 pages).

*Primary Examiner* — Gabrielle A McCormick
(74) *Attorney, Agent, or Firm* — Esplin & Associates, PC

(57) ABSTRACT

Systems and methods to monitor veracity of a collection of one or more profiles associated with a user. Exemplary implementations may: store sets of profile access strings associated with individual users, wherein individual profile access strings provide access to profile information associated with individual profiles; transmit requests for profile information; receive the profile information; analyze profile information for individual profiles included in the individual sets of profile access strings, wherein analyzing the profile information includes detecting profile access strings depicted within presentations of the profiles; determine veracity of individual sets of profile access strings, including determining whether individual ones of the profile access strings depicted within the presentations of the profiles are consistent with the profile access strings included within the individual ones of the sets of profile access strings associated with a user; generate an indication responsive to determining an inconsistency; and transmit the indication to the user.

20 Claims, 5 Drawing Sheets

(56) References Cited

U.S. PATENT DOCUMENTS

| | | | | |
|---|---|---|---|---|
| 2017/0076405 | A1* | 3/2017 | Shah | G06Q 50/01 |
| 2017/0078136 | A1 | 3/2017 | Byttow | |

* cited by examiner

SYSTEMS AND METHODS TO MONITOR VERACITY OF A COLLECTION OF ONE OR MORE PROFILES ASSOCIATED WITH A USER

FIELD OF THE DISCLOSURE

The present disclosure relates to systems and methods to monitor veracity of a collection of one or more profiles associated with a user.

BACKGROUND

Online platforms that utilize and/or provide access to user profiles are known. Profile access strings (e.g., uniform resource locators) may be used to access profile information for specific profiles hosted by such platforms. Generally, in order to enhance visibility and/or engagements of their various profiles, users may include profile access strings in their various profiles in order to effectively cross-reference their profiles across different online platforms. As the number of different online platforms continues to proliferate, it may become unmanageable for the users to ensure the veracity of the profile access strings included in their various profiles. This may have various impacts which may be inefficient, ineffective, and/or have other potentially negative effects. For example, insertion of a duped profile access string associated with a profile that is not actually controlled by or indicative of a user in a profile of such a user is one tactic used by nefarious actors to direct online traffic that intends to access additional profiles of the user to an alternative profile. The alternative profile can then be used in a variety of ways by the bad actor who planted the duped profile string into the online profile to take advantage of those who follow the duped profile string (e.g., phishing, human engineering, extracting payment or other information, diverting attention from the user, etc.).

SUMMARY

One aspect of the present disclosure relates to monitoring veracity of collections of profile access strings that correspond to profiles on online platforms. In some implementations, automatically monitoring veracity of collections of profile access strings may limit risks associated with collections of profile access strings, regardless of the size of the collections. By way of non-limiting example, monitoring veracity of collections of profile access strings may limit exposure of online traffic to duped profile access strings presented on profiles associated with the collections. For example, monitoring veracity of an individual collection of profile access strings may enable detection of susceptibility to and/or presence of duped profile strings in an online profile. In some implementations, monitoring veracity of collections of profile access strings may enable more efficient management and/or organization of profile access strings associated with users and/or referenced within profiles associated with the users.

A system configured to monitor veracity of a collection of one or more profiles associated with a user may include non-transitory electronic storage, one or more hardware processors configured by machine-readable instructions, and/or other components. The non-transitory electronic storage may be configured to store sets of profile access strings associated with the individual users. By way of non-limiting example, the sets of profile access strings may include a first set of profile access strings associated with a first user. The first set of profile access strings may include a first profile access string. In some implementations, individual profile access strings may provide access to hosted profile information associated with individual profiles. Requests indicating the individual profile access strings may result in reception of profile information associated with individual profiles. In some implementations, the profile information may facilitate presentation of a first profile associated with the first user.

The processor(s) may be configured to transmit requests for the profile information of the individual profiles. By way of non-limiting example, a first request for the first profile information may be transmitted to the first profile access string. The processor(s) may be configured to receive the profile information responsive to the requests. By way of non-limiting example, the first profile information may be received responsive to the first request. The processor(s) may be configured to analyze the profile information for individual ones of the profiles included in the individual ones of the sets of profile access strings. The profile information may be analyzed for individual ones of the sets of profile access strings. In some implementations, analyzing the profile information may include detecting profile access strings depicted within presentations of the profiles. By way of non-limiting example, analyzing the first profile information may include detecting a second profile access string depicted within presentations of the first profile. The detected profile access strings may be included in corresponding profile information. By way of non-limiting example, the second profile access string may be included in the first profile information.

The processor(s) may be configured to determine veracity of individual ones of the sets of profile access strings. In some implementations, determining the veracity may include determining whether or not individual ones of the profile access strings depicted within the presentations of the profiles are consistent with the profile access strings included within the individual ones of the sets of profile access strings. In some implementations, the determination may be made for the individual ones of the sets of profile access strings. By way of non-limiting example, consistency of the second profile access string with the profile access strings in the first set of profile access strings may be determined for the first set of profile access strings. The processor(s) may be configured to generate an indication for the user associated with a corresponding set of profile access strings. In some implementations, the indication may be generated responsive to determining an inconsistency between one of the profile access strings depicted within the presentations of the profiles and the profile access strings included within the corresponding set of profile access strings. By way of non-limiting example, responsive to determination of an inconsistency between the second profile access string and the profile access strings of the first set of profile access strings, a first indication may be generated for the first user. The first indication may denote the determined inconsistency between the second profile access string and the profile access strings in the first set of profile access strings. The processor(s) may be configured to transmit the individual indications to the individual users. By way of non-limiting example, the first indication may be transmitted to the first user.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
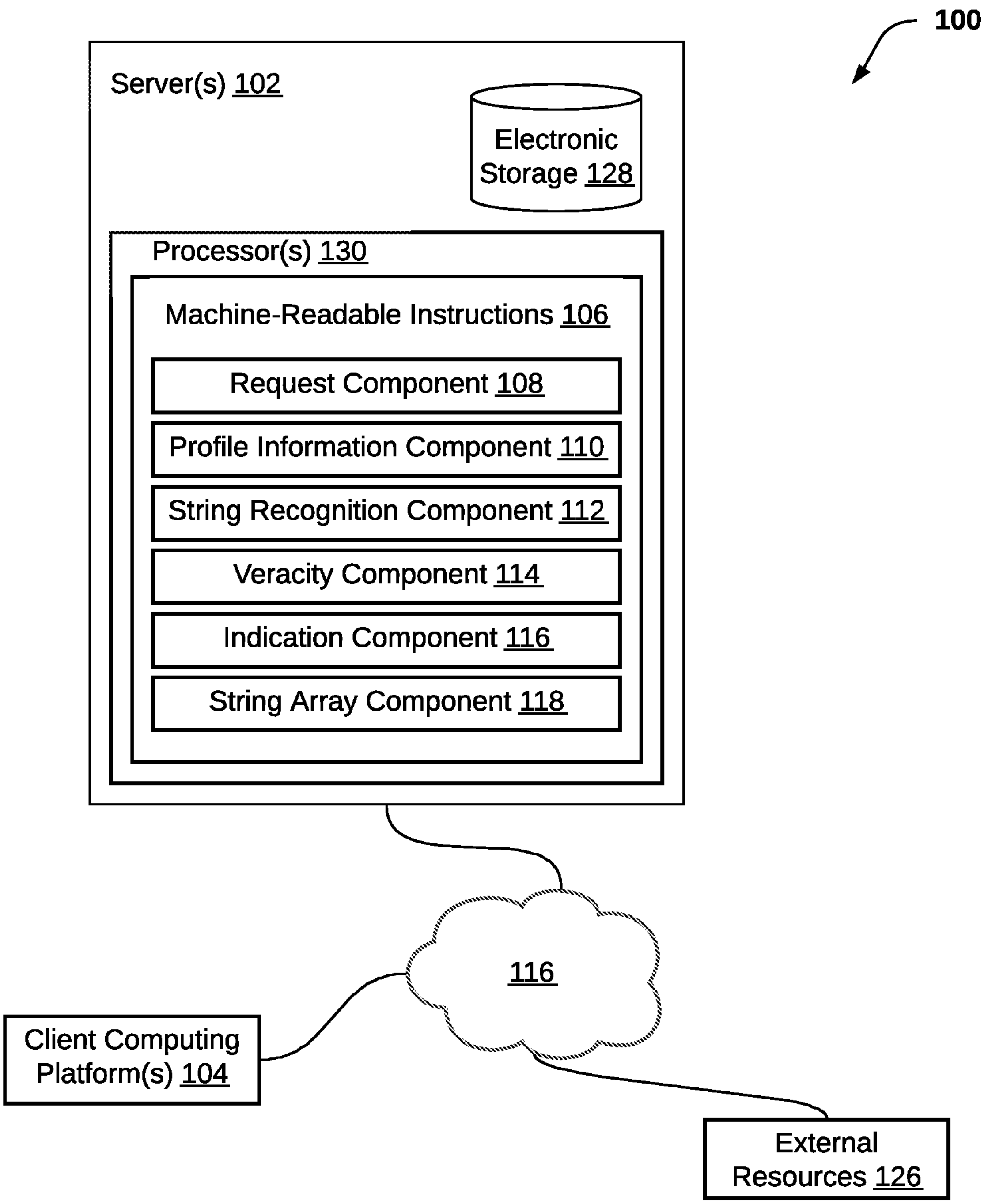
FIG. 1 illustrates a system configured to monitor veracity of a collection of one or more profiles associated with a user.

FIG. 1 illustrates a system 100 configured to monitor veracity of a collection of one or more profiles associated with a user, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Electronic storage 128 may be configured to store sets of profile access strings associated with the individual users. By way of non-limiting example, an individual profile access string may be in the form of a uniform resource locator, a uniform resource indicator, a hyperlink and/or hypertext, a public key, and/or another form. A public key may be an alphanumeric string used to identify a profile on a decentralized platform. By way of non-limiting example, decentralized platforms may include decentralized social media platforms, decentralized gaming platforms, decentralized wallets, a decentralized records platform, a decentralized storage system, and/or another decentralized platform. In some implementations, the sets of profile access strings may be obtained directly from the individual users, generated automatically, generated manually, and/or obtained with other methods. By way of non-limiting example, the sets of profile access strings may include a first set of profile access strings associated with a first user. By way of non-limiting example, the first user may be one or more people, a brand, a company, a team, a non-profit organization, another type of organization, and/or another collection of people. The first set of profile access strings may include a first profile access string. In some implementations, individual profile access strings may provide access to hosted profile information associated with individual profiles.

Server(s) 102 may be configured by machine-readable instructions 106. Machine-readable instructions 106 may include one or more instruction components. The instruction components may include computer program components. The instruction components may include one or more of request component 108, profile information component 110, string recognition component 112, veracity component 114, indication component 116, string array component 118, and/or other instruction components.

Request component 108 may be configured to transmit requests for the profile information of the individual profiles. By way of non-limiting example, a first request for the first profile information may be transmitted to the first profile access string. In some implementations, requests indicating the individual profile access strings may result in reception of profile information associated with individual profiles.

Profile information component 110 may be configured to receive the profile information of the individual profiles responsive to the requests. By way of non-limiting example, the first profile information may be received responsive to the first request. By way of non-limiting example, the individual profiles may include a social media platform account, a gaming profile, a decentralized platform identity, a decentralized platform account, a decentralized wallet, a website, a webpage, and/or other profiles accessible via one or more client computing platforms. By way of non-limiting example, the profile information may facilitate presentation of a first profile associated with the first user. The first profile may be associated with first profile information.

In some implementations, the individual profiles may be associated with profile information including one or more of information stated by the individual users about themselves, information characterizing user interaction with individual profiles, and/or other information. By way of non-limiting example, the first profile information may include one or more of information stated by the first user about the first user, information characterizing interaction by the first user with individual profiles associated with the first user, and/or other information. By way of non-limiting example, information stated by the first user about the first user may include one or more of a username, a name, a display name, a biographical description about the first user, a post created in association with, a profile access string associated with the first user, and/or other information. A post may include one or more of a status of the post, a number and/or type of reactions on the post, comments on the post, a caption on the post, media content of the post, a reference to a profile access string, a profile access string, and/or other information.

String recognition component 112 may be configured to analyze the profile information for individual ones of the profiles included in the individual ones of the sets of profile access strings. By way of non-limiting example, the analyzing may be done for individual ones of the sets of profile access strings. In some implementations, analyzing the profile information may include detecting profile access strings depicted within presentations of the profiles. In some implementations, detecting profile access strings depicted within the presentations of the profiles may include identifying depiction locations of the profile access strings within the presentations of the profiles.

In some implementations, an individual profile access string may be depicted as hypertext, a hyperlink, an icon, an image, a quick response (QR) code, and/or another form on an individual profile. By way of non-limiting example, an individual profile access string may be depicted as hypertext on a profile. The hypertext may be different than the profile access string itself. The hypertext may be associated with a profile access string such that interaction with the hypertext on a client computing platform enables transmission of a request for profile information indicating the profile access string. In some implementations, the association between the depiction of the profile access string and the profile access string itself may be included in profile information.

By way of non-limiting example, analyzing the first profile information may include detecting a second profile access string depicted within presentations of the first profile. The detected profile access strings may be included in corresponding profile information. A first depiction location within presentations of the first profile at which the second profile access string is depicted is identified. By way of non-limiting example, the second profile access string may be included in the first profile information.

String array component 118 may be configured to compile individual arrays of profile access strings. The individual arrays may include the profile access strings included in the individual sets of profile access strings, the profile access strings detected within profile information of the profile access strings included in the individual sets of profile access strings, and/or other profile access strings. The individual arrays may be associated with individual users by virtue of individual sets of profile access strings associated with the individual users being included in the individual arrays. By way of non-limiting example, a first array of profile access strings including at least the first profile access string and the second profile access string may be compiled. In some implementations, the individual arrays of profile access strings may denote corresponding profile information of individual detected profile access strings. By way of non-limiting example, the first array of profile access strings may denote the second profile access string was detected within the first profile information.

In some implementations, inclusion in the individual arrays of individual profile access strings depicted within presentations of profiles in individual arrays may be determined in accordance with the depiction locations. For example, an individual profile access string depicted in an individual profile may not be included in an individual array of profile access strings by virtue of a depiction location of the individual profile access string within a presentation of the individual profile denoting the individual profile access string is not accessible and/or not easily viewable via one or more client computing platforms accessing the presentation of the individual profile. For example, an individual profile access string depicted in the individual profile may be included in the individual array of profile access strings by virtue of a depiction location of the individual profile access string within the presentation of the individual profile denoting the individual profile access string is accessible via one or more client computing platforms accessing the presentation of the individual profile.

By way of non-limiting example, an individual profile access string may be depicted in a biography section of a profile on a social media platform. The biography section may be displayed at the top of a user interface for presenting the profile. The individual profile access string may be included in an individual array of profile access strings by virtue of the individual profile access string being depicted at or near the top of the presentation of the profile. By way of non-limiting example, another profile access string may be depicted in a post on the profile. For example, the post may be depicted at or near the bottom of the profile by virtue of more recent posts on the profile such that the post may not be visible on a beginning screen of the profile. In some implementations, a user of a client computing platform presenting the profile may need to scroll and/or change a page on the profile in order to view the other profile access string. The other profile access string may not be included in the individual array of profile access strings by virtue of being depicted at or near the end of the profile. By way of non-limiting example, a profile access string depicted at or near the end of a profile given that the presentation profile is under a given length threshold.

Figure 3:
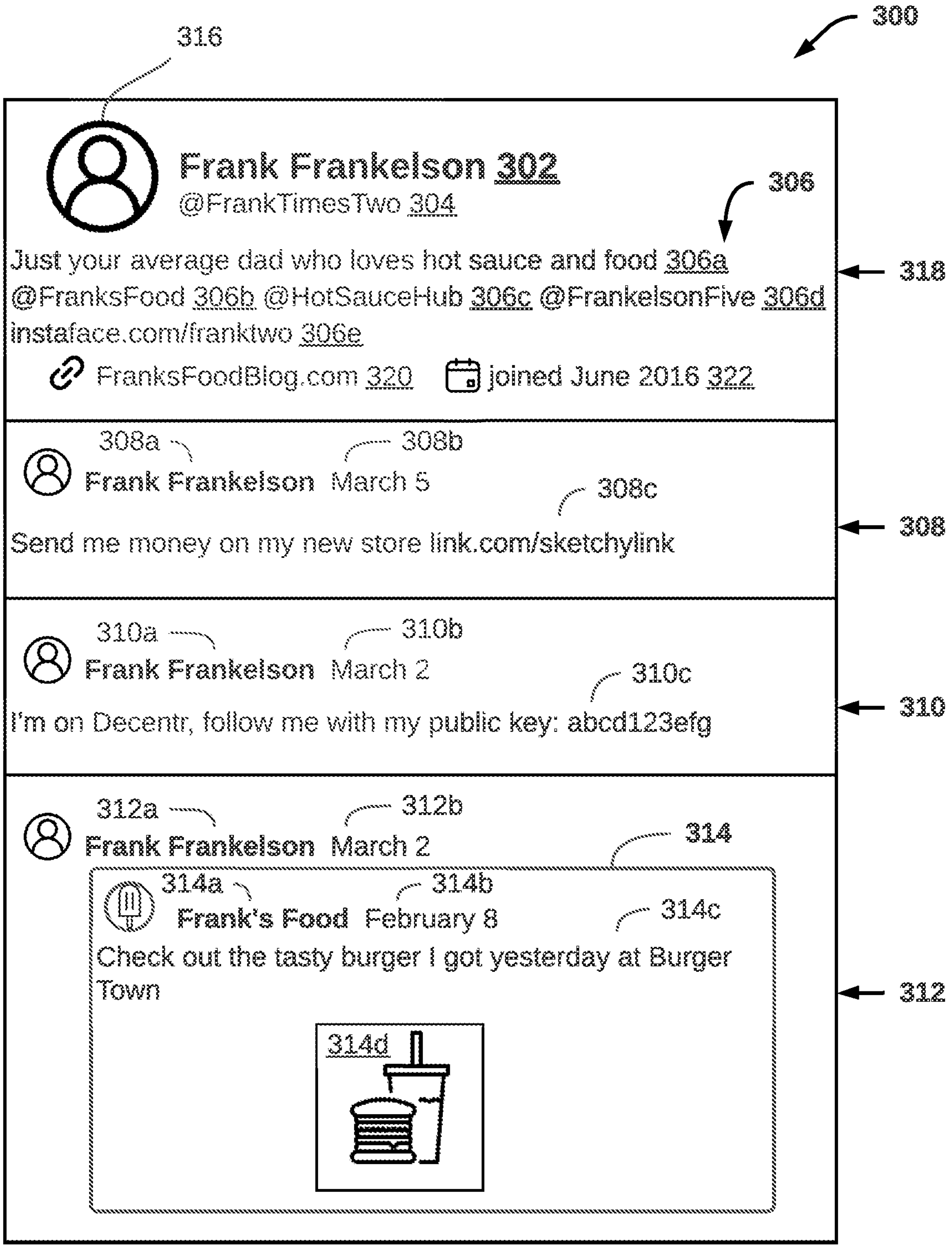
FIG. 3 illustrates an exemplary profile on a social media platform associated with an individual user.

FIG. 3 illustrates an exemplary profile 300 on a social media platform. By way of non-limiting example, profile 300 may be associated with a user named Frank Frankelson. For example, profile 300 may be a profile on an individual social medial platform. Profile 300 may include a profile summary 318, a first post 308, a second post 310, and a third post 312. By way of non-limiting example, profile summary 318 may include information about the user stated by the user. Profile summary 318 may include a display name 302, a username 304, a biographical summary 306, a profile access string 320, and a profile creation date 322. Biographical summary 306 may include a description **306*a* and profile access strings 306*b*-306*e*. For example, profile access strings 306*b*-306*d* may be profile access strings associated with individual profiles on the individual social media platform. For example, profile access strings 306*b* may be hypertext. In some implementations, the hyperlink associated with profile access string 306*b* may be included in a set of profile access strings associated with the user. Profile access string 306***e* may be associated with an individual profile on another social media platform. Profile access string 320 may be associated with a website associated with the user. By way of non-limiting example, profile access string 306*e* and profile access string 320 may be uniform resource locators and/or hyperlinks.

First post 308 may include a display name 308*a*, a post creation date 308*b*, and text content 308*c*. For example, text content 308*c* may include a profile access string in the form of a uniform resource locator and denoted by "link.com/sketchylink." Second post 310 may include a display name 310*a*, a post creation date 310*b*, and text content 310*c*. Text content 310*c* may include a profile access string in the form of a public key and denoted by "abcd123efg." Third post 312 may include a display name 312*a*, a post creation date 312*b*, and a fourth post 314. By virtue of fourth post 314 being included in third post 312, third post 312 may be a repost of fourth post 314. Fourth post 314 may include a display name 314*a*, a post creation date 314*b*, text content 314*c*, and an image 314*d*. By way of non-limiting example, fourth post 314 may have been created by Frank Frankelson using another profile on the individual social media platform.

Figure 4:
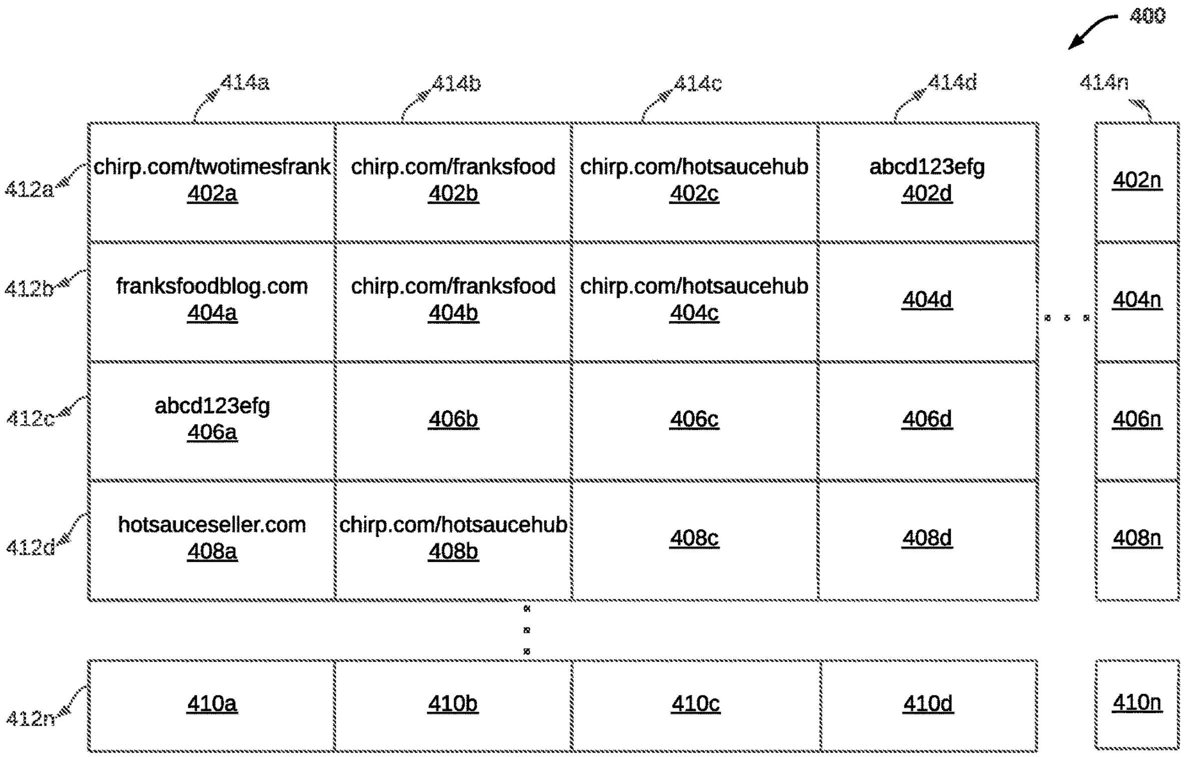
FIG. 4 illustrates an exemplary array of profile access strings associated with an individual user.

FIG. 4 illustrates an exemplary array 400 of profile access strings associated with an individual user. By way of non-limiting example, the individual user may be the same user as the user associated with profile 300 in FIG. 3. Array 400 may include rows 412*a*-412*n* and columns 414*a*-414*n*. By way of non-limiting example, column 414*a* may include profile access strings included in a set of profile access strings associated with the individual user. In some implementations, the profile access strings included in column 414*a* may be obtained directly from the set of profile access strings. In some implementations, the profile access strings included in columns 414*b*-414*n* may be detected profile access strings. Row 412*a* may include array elements 402*a*-402*n*. Array elements 402*a*-402*d* may be depicted as including profile access strings. By way of non-limiting example, the profile access string included in array element 402*a* may be associated with a first profile on a social media platform. Array 400 may include array elements 402*a*-402*n*, array elements 404*a*-404*n*, array elements 406*a*-406*n*, and array elements 408*a*-408*n*, and array elements 410*a*-410*n*. Individual ones of the array elements included in array 400 may include profile access strings, indications of veracity of the profile access strings, and/or other information. By way of non-limiting example, the profile access strings included in array elements 402*b*-402*n* may depicted in the first profile. As such, profile access strings included in array elements 402*b*-402*n* may have been detected in the first profile. By way of non-limiting example, the profile access string included in array element 406*a* may be a public key associated with a profile on a decentralized platform.

In some implementations, one or more of the array elements may be empty and/or include information characterizing the array elements are not applicable. In some implementations, one or more of the array elements may be vacant and/or include information characterizing the array elements do not include profile access strings. Array elements 406*b*-406*n* may be vacant, include information characterizing the array elements do not include profile access strings, and/or be nonexistent by virtue of the profile on the decentralized platform not depicting other profile access strings.

In some implementations, individual profile access strings may only be included in an array of profile access strings once. For example, a profile access string designated by "hotsauceseller.com" may be depicted in a profile associated with the profile access string included in array element 404*a*. The profile access string designated by "hotsauceseller.com" may be the same as the profile access string included in array element 408*a*. Array element 408*a* may include the profile access string included in the set of profile access strings associated with the individual user. In some implementations, the profile access string designated by "hotsauceseller.com" may not be included in another array element by virtue of already being included in array element 408*a*.

Any description herein of an array may refer to an array of up to n-dimensions. An n-dimensional array may be a two-dimensional array. However, specific descriptions and/or depictions of a two-dimensional array (e.g., a two-dimensional array of profile access strings) may be further organized into additional dimensions (e.g., with a third dimension and/or other dimensionalities) without departing from the scope of this disclosure. By way of non-limiting example, a third dimension may be used for identifying profile access strings included in profile information of detected profile access strings. For example, a third dimension of a first array of profile access strings may include profile access strings included within profile information of the second profile access string.

Referring back to FIG. 1, veracity component 114 may be configured to determine veracity of individual ones of the sets of profile access strings. Veracity of an individual set of profile access strings may be determined based on consistency of the individual set of profile access strings, security of the profile access strings, and/or association of the individual set of profile access strings with an individual user. In some implementations, determining the veracity may include determining whether or not individual ones of the profile access strings depicted within the presentations of the profiles are consistent with the profile access strings included within the individual ones of the sets of profile access strings, individual ones of the arrays of profile access strings, and/or associated with the individual users. In some implementations, the determination may be made for the individual ones of the sets of profile access strings. In some implementations, an inconsistency between one of the profile access strings depicted within the presentations of the profiles and the profile access strings included within the corresponding set of profile access strings may denote one or more of a low level of security of the set of profile access strings, a low level of association of the set of profile access strings with an individual user, and/or other information. In some implementations, a low level of security of the set of profile access strings may be due to one or more profile access strings included in the set of profile access strings having a low level of security. In some implementations, a low level of association of the set of profile access strings with the individual user may be due to one or more profile access strings included in the set of profile access strings having a low level of association with the individual user.

In some implementations, a set of profile access strings may have a low level of security due to profile information associated with one or more of the profile access strings depicted within the presentations of the profiles including information created by someone or something (e.g., a computer system) other than the individual user, ability for someone or something other than the individual user to modify profile information, the profile information including information that is uncharacteristic of the individual user, one or more of the profile access strings having a low level of security, and/or other information denoting a low level of security of the profile access strings. By way of non-limiting example, an individual profile access string in the form of a uniform resource locator may have a low level of security by virtue of a website associated with individual profile access string being associated with fraudulent activity, computer viruses, and/or other nefarious behavior.

By way of non-limiting example, the profile access string included in text content 308*c* (shown in FIG. 3) and denoted by "link.com/sketchylink" may lower the security of the set of profile access strings associated with Frank Frankelson. The profile access string denoted by "link.com/sketckylink" may lower the security by virtue of the website "link.com" being associated with fraudulent activity. In some implementations, individual profile access strings may not be included in an array of profile access strings by virtue of lowering security of a set of profile access strings associated with the array and/or the array itself. For example, the profile access string included in text content 308*c* may not be included in array 400 (shown in FIG. 4) of profile access strings by virtue of the profile access string lowering security of a set of profile access strings associated with Frank Frankelson.

Referring back to FIG. 1, a low level of association of the set of profile access strings with an individual user may include profile information associated with one or more of the profile access strings depicted within the presentations of the profiles including information uncharacteristic of the individual user, a theme or message conveyed by presentation of a profile in the set of profile access strings, a brand associated with the individual user, and/or other associations of the individual user. For example, profile information associated with one or more profile access strings included in a set of profile access strings associated with an individual user may include information pertaining to food. As such, the one or more profiles associated with the one or more profile access strings may pertain to food. A profile access string may be depicted in at least one of the profiles pertaining to food. A low level of association of the set of profile access strings with the individual user may be a result of the depicted profile access string being associated with a profile associated with electronic gaming.

By way of non-limiting example, consistency of the second profile access string with the profile access strings in the first set of profile access strings may be determined for the first set of profile access strings. The second profile access string may be associated with a second profile including second profile information. The second profile access string may be consistent with the first set of profile access strings by virtue of one or more of the second profile information being received responsive to a request for the second profile information being transmitted, the second profile access string being included in the first set of profile access strings, the first profile information and the second profile information being compatible, and/or other characteristics affecting consistency between the second profile access string and the first set of profile access strings. In some implementations, the second profile access string being included in the first set of profile access strings may include the second profile being associated with an individual profile access string included in the first set of profile access strings.

In some implementations, an individual profile access string that is determined to be inconsistent with one or more of the profile access strings included within the individual ones of the sets of profile access strings, individual ones of the arrays of profile access strings, and/or associated with the individual users may be removed and/or not included in an individual array of profile access strings. In some implementations, the inconsistent profile access string and/or information indicating one or more inconsistencies may be included in the individual array of profile access strings.

In some implementations, veracity component 114 may be configured to identify individual sets of inconsistent profile access strings. Identifying the individual sets may be based on the determination of whether or not individual ones of the profile access strings depicted within one of the profiles are consistent with the profile access strings included within a corresponding set of profile access strings.

Indication component 116 may be configured to generate an indication for the user associated with a corresponding set of profile access strings. In some implementations, the indication may be generated responsive to determining an inconsistency between one of the profile access strings depicted within the presentations of the profiles and the profile access strings included within the corresponding set of profile access strings. By way of non-limiting example, responsive to determination of an inconsistency between the second profile access string and the profile access strings of the first set of profile access strings, a first indication may be generated for the first user. The first indication may denote the determined inconsistency between the second profile access string and the profile access strings in the first set of profile access strings. In some implementations, the indications for the individual users may denote suggestions for increasing consistency of individual ones of the profile access strings depicted within the presentations of the profiles and the profile access strings included within the individual ones of the sets of profile access strings. By way of non-limiting example, the first indication may denote a suggestion for increasing consistency between the second profile access string and the first profile access string.

By way of non-limiting example, the first indication indicating a low level of security of the first set of profile access strings may denote that a fraudulent link is depicted in the first profile. For example, the first indication may indicate a suggestion that the first user should remove the fraudulent link from the first profile. By way of non-limiting example, the first indication denoting a suggestion for increasing consistency may include an indication that the first user should include a profile access string associated with a particular profile in the first set of profile access strings.

In some implementations, indication component 116 may be configured to generate one or more individual indications of the individual sets of inconsistent profile access strings. By way of non-limiting example, such indications may characterize inconsistencies between individual profile access strings included in the individual sets of inconsistent profile access strings and individual profile access strings included in the corresponding set of profile access strings.

Indication component 116 may be configured to transmit the one or more individual indications to the individual users. In some implementations, an individual indication may be transmitted to an individual user through a push notification, an instant message, an email, a phone call, and/or other forms of communication with the individual user. In some implementations, an individual notification may be transmitted to individual users via presentation on one or more computing platforms. The presentation on the one or more computing platforms may be in the form of an icon, an image, a badge, text, and/or another form. By way of non-limiting example, an individual indication may be presented on one or more client computing platforms as a badge on a webpage. For example, interaction by an individual user with the badge may link the individual user to more information associated with an individual set of profile access strings. By way of non-limiting example, the first indication may be transmitted to the first user.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116, 118 and/or other components. Processor(s) 130 may be configured to execute components 108, 110, 112, 114, 116, 118 and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118 are illustrated in FIG. 1 as being implemented within a single processing unit, in implementations in which processor(s) 130 includes multiple processing units, one or more of components 108, 110, 112, 114, 116, and/or 118 may be implemented remotely from the other components. The description of the functionality provided by the different components 108, 110, 112, 114, 116 and/or 118 described below is for illustrative purposes, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 130 may be configured to execute one or more additional components that may perform some or all of the functionality attributed below to one of components 108, 110, 112, 114, 116, and/or 118.

Figure 2A:
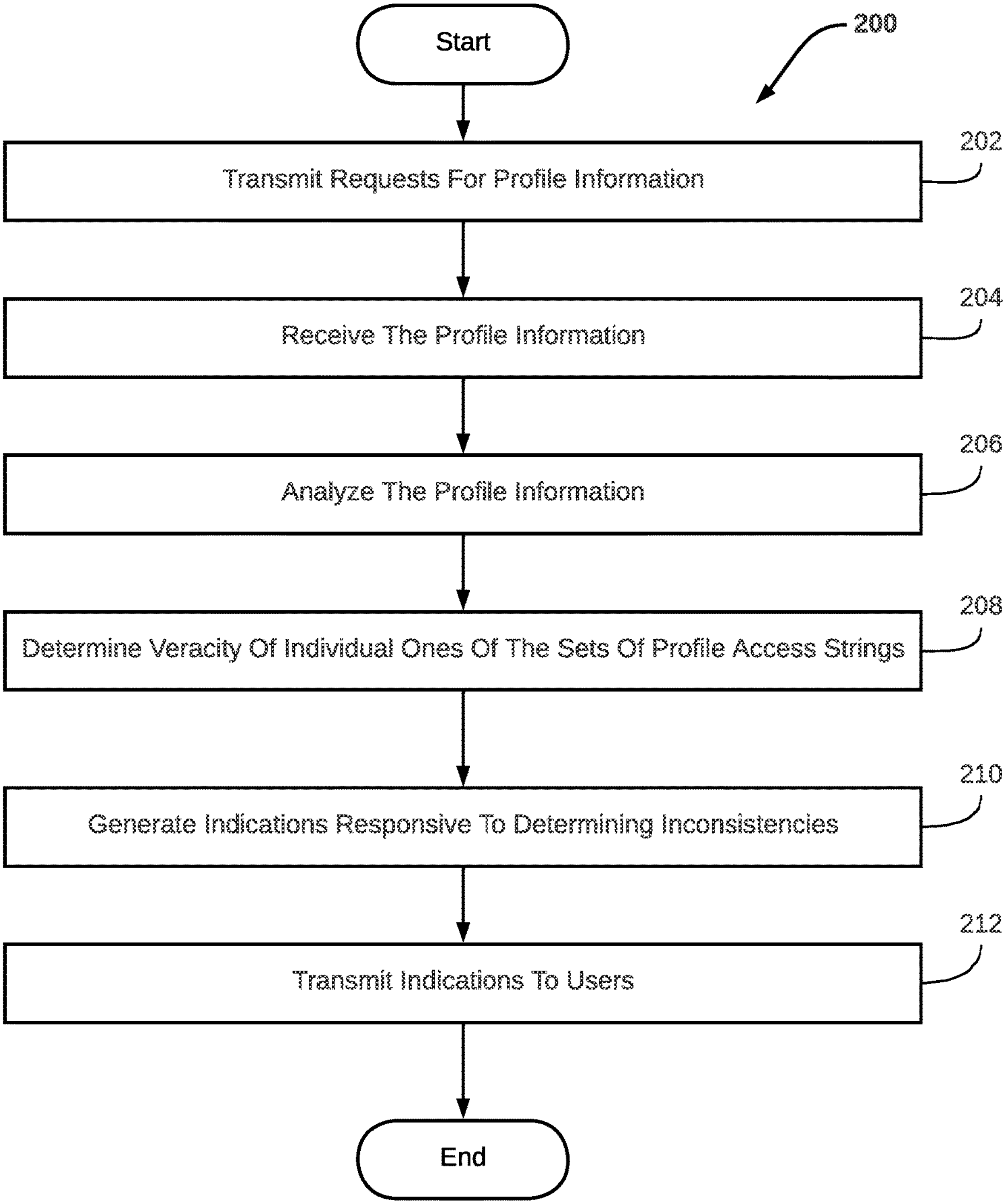
FIGS. 2A and 2B illustrate a method of monitoring veracity of a collection of one or more profiles associated with a user.
Figure 2B:
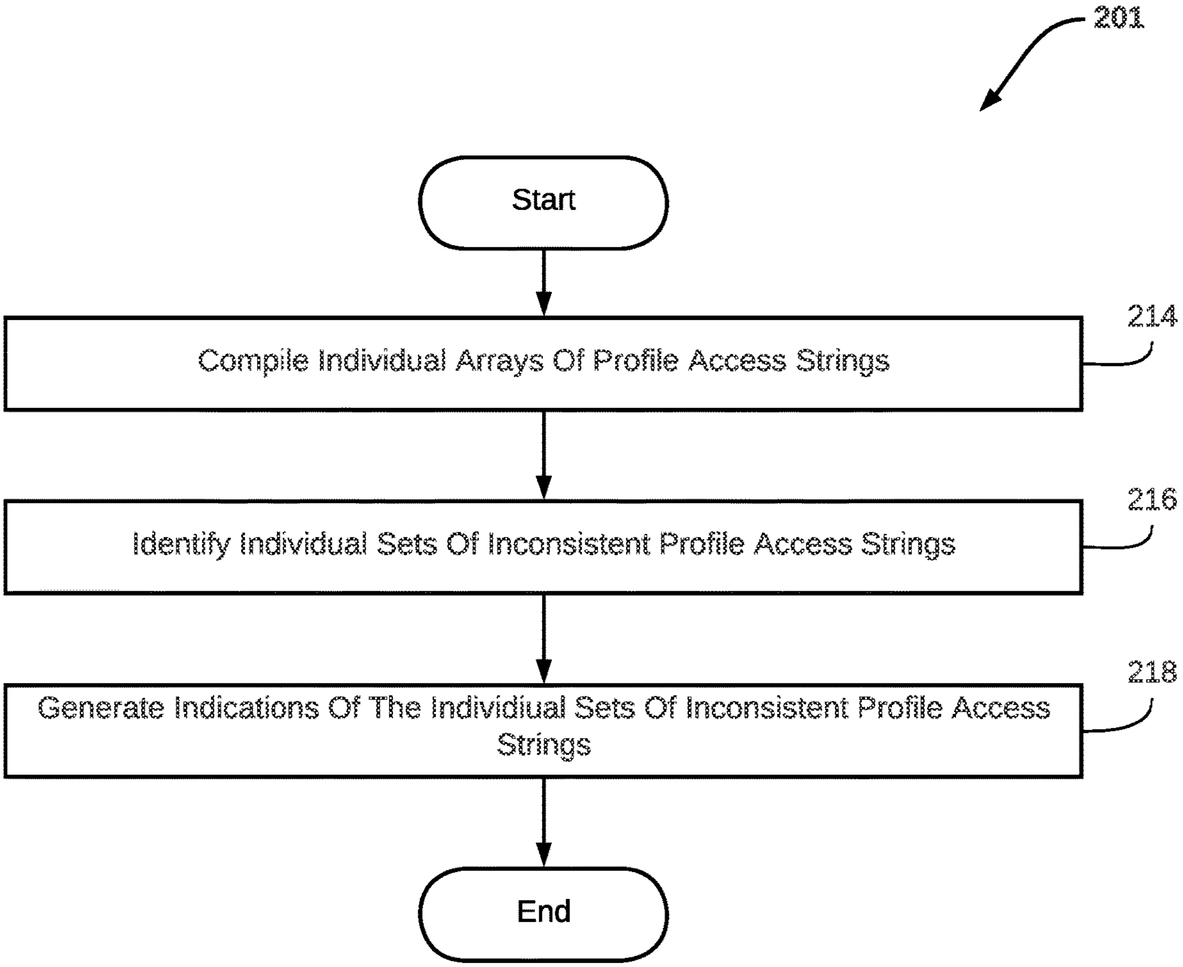

FIGS. 2A and 2B illustrate methods 200 and 201 for personalizing offers for presentation to users. The operations of methods 200 and 201 presented below are intended to be illustrative. In some implementations, methods 200 and 201 may be accomplished with one or more additional operations not described, and/or without one or more of the operations discussed. Additionally, the order in which the operations of method 200 and 201 are illustrated in FIGS. 2A and 2B and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include transmitting requests for profile information of individual profiles. By way of non-limiting example, a first request for profile information may be transmitted to a first profile access string. Individual sets of profile access strings may be associated with individual users. Requests indicating the individual profile access strings may result in reception of profile information associated with individual profiles that facilitates presentation of corresponding profiles. Operation 202 may be performed by one or more hardware processors configured by machine-readable instructions including a component that is the same as or similar to request component 108, in accordance with one or more implementations.

An operation 204 may include receiving the profile information responsive to the requests. By way of non-limiting example, first profile information may be received responsive to the first request. Operation 204 may be performed by one or more hardware processors configured by machine-readable instructions including a component that is the same as or similar to profile information component 110, in accordance with one or more implementations.

An operation 206 may include analyzing the profile information for individual ones of the profiles included in individual ones of the sets of profile access strings, for individual ones of the sets of profile access strings. In some implementations, analyzing the profile information may include detecting profile access strings depicted within presentations of the profiles. By way of non-limiting example, analyzing the first profile information may include detecting a second profile access string depicted within presentations of the first profile. In some implementations, the detected profile access strings may be included in corresponding profile information. By way of non-limiting example, the second profile access string may be included in the first profile information. Operation 206 may be performed by one or more hardware processors configured by machine-readable instructions including a component that is the same as or similar to string recognition component 112, in accordance with one or more implementations.

An operation 208 may include determining veracity of individual ones of the sets of profile access strings. In some implementations, determining the veracity may include determining, for the individual ones of the sets of profile access strings, whether or not individual ones of the profile access strings depicted within the presentations of the profiles are consistent with the profile access strings included within the individual ones of the sets of profile access strings. By way of non-limiting example, for the first set of profile access strings, consistency of the second profile access string with the profile access strings in the first set of profile access strings may be determined. Operation 208 may be performed by one or more hardware processors configured by machine-readable instructions including a component that is the same as or similar to veracity component 114, in accordance with one or more implementations.

An operation 210 may include generating an indication for the user associated with the corresponding set of profile access strings, responsive to determining an inconsistency between one of the profile access strings depicted within the presentations of the profiles and the profile access strings included within a corresponding set of profile access strings. In some implementations, one or more individual indications may be generated responsive to determining one or more inconsistencies between one or more profile access strings depicted within the presentations of the profiles and the profile access strings included within corresponding sets of profile access strings. By way of non-limiting example, a first indication may be generated for the first user denoting a first determined inconsistency between the second profile access string and the profile access strings in the first set of profile access strings, responsive to determination of the first determined inconsistency. Operation 210 may be performed by one or more hardware processors configured by machine-readable instructions including a component that is the same as or similar to indication component 116.

An operation 212 may include transmitting individual indications to the individual users. By way of non-limiting example, the first indication may be transmitted to the first user. Operation 212 may be performed by one or more hardware processors configured by machine-readable instructions including a component that is the same as or similar to indication component 116.

In some implementations, method 201 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 201 in response to instructions stored electronically on an electronic storage medium. The one or more processing devices may include one or more devices configured through hardware, firmware, and/or software to be specifically designed for execution of one or more of the operations of method 201. FIG. 2B illustrates method 201, in accordance with one or more implementations. In some implementations, the operations of method 201 may be performed after or responsive to the operations of method 200 (shown in FIG. 2A). In some implementations, the operations of method 201 may be performed at the same time as the operations of method 200 (shown in FIG. 2A).

An operation 214 may include compiling individual arrays of profile access strings for each of the sets of profile access strings. In some implementations, the individual array may include the profile access strings included in the individual sets of profile access strings and the profile access strings detected within profile information of the profile access strings included in the individual sets of profile access strings. By way of non-limiting example, a first array of profile access strings including at least the first profile access string and the second profile access string may be compiled. The individual arrays of profile access strings may denote corresponding profile information of individual detected profile access strings. By way of non-limiting example, the first array of profile access strings may denote the second profile access string was detected within the first profile information. In some implementations, operation 214 may be performed after or responsive to operation 206 (shown in FIG. 2A). Operation 214 may be performed by one or more hardware processors configured by machine-readable instructions including a component that is the same as or similar to string array component 118.

An operation 216 may include identifying individual sets of inconsistent profile access strings. In some implementations, identifying the individual sets may be based on the determination of whether or not individual ones of the profile access strings depicted within one of the profiles are consistent with the profile access strings included within a corresponding set of profile access strings. In some implementations, operation 216 may be performed after or responsive to operation 208 (shown in FIG. 2A). Operation 216 may be performed by one or more hardware processors configured by machine-readable instructions including a component that is the same as or similar to veracity component 114.

An operation 218 may include generating individual indications of the individual sets of inconsistent profile access strings. In some implementations, the indication may characterize inconsistencies between individual profile access strings included in the individual sets of inconsistent profile access strings and individual profile access strings included in the corresponding set of profile access strings. In some implementations, operation 218 may be performed after or responsive to operation 210 (shown in FIG. 2A). In some implementations, operation 218 may be performed concurrently with operation 210 (shown in FIG. 2A). Operation 218 may be performed by one or more hardware processors configured by machine-readable instructions including a component that is the same as or similar to indication component 116.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to monitor veracity of a collection of one or more profiles associated with a user, the system comprising:

non-transitory electronic storage media configured to store sets of profile access strings associated with individual users, wherein the sets of profile access strings include a first set of profile access strings associated with a first user, wherein the first set of profile access strings includes a first profile access string, wherein individual profile access strings provide access to hosted profile information associated with individual profiles, wherein reception of profile information associated with individual profiles facilitates presentation of corresponding profiles such that reception of first profile information facilitates presentation of a first profile associated with the first user;

one or more hardware processors configured by machine-readable instructions to:

receive the profile information from individual servers storing the profile information, such that the first profile information is received from a first server storing the first profile information;

detect profile access strings depicted within presentations of the profiles such that a second profile access string is depicted within presentations of the first profile, wherein the detected profile access strings are included in corresponding profile information such that the second profile access string is included in the first profile information;

determine, for the individual ones of the sets of profile access strings, whether or not individual ones of the profile access strings depicted within the presentations of the profiles are consistent with the profile access strings included within the individual ones of the sets of profile access strings such that, for the first set of profile access strings, consistency of the second profile access string with the profile access strings in the first set of profile access strings is determined;

generate, responsive to determining an inconsistency between one of the profile access strings depicted within the presentations of the profiles and the profile access strings included within a corresponding set of profile access strings, an indication for the user associated with the corresponding set of profile access strings such that, responsive to determination of an inconsistency between the second profile access string and the profile access strings of the first set of profile access strings, a first indication is generated for the first user denoting the determined inconsistency between the second profile access string and the profile access strings in the first set of profile access strings; and transmit the indication to the individual users such that the first indication is transmitted to the first user.

2. The system of claim 1, wherein the individual profiles are associated with profile information including at least one of information stated by the individual users about themselves and information characterizing user interaction with the individual profiles such that the first profile is associated with first profile information including at least one of information stated by the first user about the first user and information determined characterizing interaction by the first user with individual profiles associated with the first user.

3. The system of claim 1, wherein an inconsistency between one of the profile access strings depicted within the presentations of the profiles and the profile access strings included within the corresponding set of profile access strings denotes one or more of a low level of security of the set of profile access strings and a low level of association of the set of profile access strings with an individual user.

4. The system of claim 1, wherein the one or more hardware processors are configured to:

compile individual arrays of profile access strings for each of the sets of profile access strings, wherein the individual arrays include the profile access strings included in the individual sets of profile access strings and the profile access strings detected within profile information of the profile access strings included in the individual sets of profile access strings, such that a first array of profile access strings including at least the first profile access string and the second profile access string is compiled, wherein the individual arrays of profile access strings denote corresponding profile information of individual detected profile access strings such that the first array of profile access strings denotes the second profile access string was detected within the first profile information.

5. The system of claim 1, wherein the second profile access string is associated with a second profile including second profile information, wherein the second profile access string being consistent with the first set of profile access strings includes one or more of the second profile information being received from a second server storing the second profile information, the second profile access string being included in the first set of profile access strings, and the first profile information and the second profile information being compatible.

6. The system of claim 5, wherein the second profile access string being included in the first set of profile access strings includes the second profile being associated with an individual profile access string included in the first set of profile access strings.

7. The system of claim 4, wherein detecting profile access strings depicted within the presentations of the profiles includes identifying depiction locations of the profile access strings within the presentations of the profiles such that a first depiction location within presentations of the first profile at which the second profile access string is depicted is identified, wherein inclusion of individual profile access strings depicted within presentations of profiles in individual arrays is determined in accordance with the depiction locations.

8. The system of claim 7, wherein an individual profile access string depicted in an individual profile is not included in an individual array of profile access strings by virtue of a depiction location of the individual profile access string within a presentation of the individual profile denoting the individual profile access string is not accessible via one or more client computing platforms accessing the presentation of the individual profile, wherein another individual profile access string depicted in the individual profile is included in the individual array of profile access strings by virtue of a depiction location of the other individual profile access string within the presentation of the individual profile denoting the individual profile access string is accessible via one or more client computing platforms accessing the presentation of the individual profile.

9. The system of claim 1, wherein the indications for the individual users denote suggestions for increasing consistency of individual ones of the profile access strings depicted within the presentations of the profiles and the profile access strings included within the individual ones of the sets of profile access strings, such that the first indication denotes a suggestion for increasing consistency between the second profile access string and the first profile access string.

10. The system of claim 1, wherein the one or more hardware processors are configured to:

identify individual sets of inconsistent profile access strings based on the determination of whether or not individual ones of the profile access strings depicted within one of the profiles are consistent with the profile access strings included within a corresponding set of profile access strings; and generate individual indications of the individual sets of inconsistent profile access strings, wherein the indication characterizes inconsistencies between individual profile access strings included in the individual sets of inconsistent profile access strings and individual profile access strings included in the corresponding set of profile access strings.

11. A method of monitoring veracity of a collection of one or more profiles associated with a user, the method including:

storing, by one or more hardware processors, sets of profile access strings associated with individual users, wherein the sets of profile access strings include a first set of profile access strings associated with a first user, wherein the first set of profile access strings includes a first profile access strings include a first set of profile access strings associated with a first user, wherein the first set of profile access strings includes a first profile access string, wherein individual profile access strings provide access to hosted profile information associated with individual profiles, wherein reception of profile information associated with individual profiles facilitates presentation of corresponding profiles such that reception of first profile information facilitates presentation of a first profile associated with the first user;

receiving, by the one or more hardware processors, the profile information of individual profiles from individual servers storing the profile information, such that the first profile information of a first profile is received from a first server storing the first profile information;

detecting, by the one or more hardware processors, profile access strings depicted within presentations of the profiles such that a second profile access string is depicted within presentations of the first profile, wherein the detected profile access strings are included in corresponding profile information such that the second profile access string is included in the first profile information;

determining, by the one or more hardware processors, for the individual ones of the sets of profile access strings, whether or not individual ones of the profile access strings depicted within the presentations of the profiles are consistent with the profile access strings included within the individual ones of the sets of profile access strings such that, for the first set of profile access strings, consistency of the second profile access string with the profile access strings in the first set of profile access strings is determined;

generating, by the one or more hardware processors, responsive to determining an inconsistency between one of the profile access strings depicted within the presentations of the profiles and the profile access strings included within a corresponding set of profile access strings, an indication for the user associated with the corresponding set of profile access strings such that, responsive to determination of an inconsistency between the second profile access string and the profile access strings of the first set of profile access strings, a first indication is generated for the first user denoting the determined inconsistency between the second profile access string and the profile access strings in the first set of profile access strings; and transmitting, by the one or more hardware processors, the indication to the individual users such that the first indication is transmitted to the first user.

12. The method of claim 11, wherein the individual profiles are associated with profile information including at least one of information stated by the individual users about themselves and information characterizing user interaction with the individual profiles such that the first profile is associated with first profile information including at least one of information stated by the first user about the first user and information determined characterizing interaction by the first user with individual profiles associated with the first user.

13. The method of claim 11, wherein an inconsistency between one of the profile access strings depicted within the presentations of the profiles and the profile access strings included within the corresponding set of profile access strings denotes one or more of a low level of security of the set of profile access strings and a low level of association of the set of profile access strings with an individual user.

14. The method of claim 11, wherein the method includes:

compiling individual arrays of profile access strings for each of the sets of profile access strings, wherein the individual arrays include the profile access strings included in the individual sets of profile access strings and the profile access strings detected within profile information of the profile access strings included in the individual sets of profile access strings, such that a first array of profile access strings including at least the first profile access string and the second profile access string is compiled, wherein the individual arrays of profile access strings denote corresponding profile information of individual detected profile access strings such that the first array of profile access strings denotes the second profile access string was detected within the first profile information.

15. The method of claim 11, wherein the second profile access string is associated with a second profile including second profile information, wherein the second profile access string being consistent with the first set of profile access strings includes one or more of the second profile information being received from a second server storing the second profile information, the second profile access string being included in the first set of profile access strings, and the first profile information and the second profile information being compatible.

16. The method of claim 15, wherein the second profile access string being included in the first set of profile access strings includes the second profile being associated with an individual profile access string included in the first set of profile access strings.

17. The method of claim 14, wherein detecting profile access strings depicted within the presentations of the profiles includes identifying depiction locations of the profile access strings within the presentations of the profiles such that a first depiction location within presentations of the first profile at which the second profile access string is depicted is identified, wherein inclusion of individual profile access strings depicted within presentations of profiles in individual arrays is determined in accordance with the depiction locations.

18. The method of claim 17, wherein an individual profile access string depicted in an individual profile is not included in an individual array of profile access strings by virtue of a depiction location of the individual profile access string within a presentation of the individual profile denoting the individual profile access string is not accessible via one or more client computing platforms accessing the presentation of the individual profile, wherein another individual profile access string depicted in the individual profile is included in the individual array of profile access strings by virtue of a depiction location of the other individual profile access string within the presentation of the individual profile denoting the individual profile access string is accessible via one or more client computing platforms accessing the presentation of the individual profile.

19. The method of claim 11, wherein the indications for the individual users denote suggestions for increasing consistency of individual ones of the profile access strings depicted within the presentations of the profiles and the profile access strings included within the individual ones of the sets of profile access strings, such that the first indication denotes a suggestion for increasing consistency between the second profile access string and the first profile access string.

20. The method of claim 11, wherein the method includes:

identifying individual sets of inconsistent profile access strings based on the determination of whether or not individual ones of the profile access strings depicted within one of the profiles are consistent with the profile access strings included within a corresponding set of profile access strings; and generating individual indications of the individual sets of inconsistent profile access strings, wherein the indication characterizes inconsistencies between individual profile access strings included in the individual sets of inconsistent profile access strings and individual profile access strings included in the corresponding set of profile access strings.

* * * * *